United States Patent [19]

Corley et al.

[11] 4,422,948

[45] Dec. 27, 1983

[54] LOST CIRCULATION MATERIAL

[75] Inventors: Wallace T. Corley; David L. Dorsey, both of Houston, Tex.

[73] Assignee: Mayco Wellchem, Inc., Houston, Tex.

[21] Appl. No.: 300,375

[22] Filed: Sep. 8, 1981

[51] Int. Cl.³ .............................................. C09K 7/02
[52] U.S. Cl. .................................. 252/8.5 LC; 175/72
[58] Field of Search .............. 252/8.5 L, 8.5 C, 8.5 A, 252/8.55 R

[56] References Cited

U.S. PATENT DOCUMENTS

| | | | |
|---|---|---|---|
| 2,119,829 | 6/1938 | Parsons | 252/8.5 |
| 2,793,995 | 5/1957 | Twining | 252/8.5 |
| 2,811,488 | 10/1957 | Nestle et al. | 252/8.5 |
| 3,375,888 | 3/1968 | Lummus et al. | 175/72 |
| 3,433,740 | 3/1969 | Armentrout | 252/8.5 |
| 3,574,099 | 3/1971 | Ryals et al. | 252/8.5 |
| 3,629,102 | 12/1971 | Lummus et al. | 252/8.5 |
| 3,986,964 | 10/1976 | Smithey | 252/8.5 |
| 4,289,632 | 9/1981 | Clear | 252/8.5 |

Primary Examiner—Herbert B. Guynn
Attorney, Agent, or Firm—Pravel, Gambrell, Hewitt, Kirk & Kimball

[57] ABSTRACT

A lost circulation material is described wherein a mixture of flexible flakes, fibers and granular particles, preferably shredded paper, mineral wool and calcium carbonate, respectively, which, when maintained in a carrying liquid being circulated through a well during drilling operations, acts to stop the loss of drilling fluid into permeable or fractured formations. The seal on the formation can be degraded by contact with an acidizing acid, such as hydrochloric acid, allowing a potential hydrocarbon producing formation to be reopened for production after a seal has been effected using the material of the invention.

9 Claims, No Drawings

LOST CIRCULATION MATERIAL

BACKGROUND OF THE INVENTION

When drilling wells, such as oil wells, a drilling fluid is circulated in the well during drilling operations. The drilled formations have fractures or high permeability which sometimes allows the drilling fluid to dissipate into the formation causing a loss of drilling fluid and lost circulation during drilling operations. Materials added to the drilling fluid to stop the loss are called lost circulation materials or additives. Many lost circulation materials consisting of varying combinations of flakes, fibers and granules have been used and described in the art. For example, U.S. Pat. No. 3,375,888 teaches the use of nutshells, shredded carpet and lacquered regenerated cellulose in a three component system to prevent or restore lost circulation.

While such mixtures described in the prior art does have some advantages, the mixtures presently available leave much to be desired in a particularly important area.

A lost circulation material is described in U.S. Pat. No. 3,574,099 which pins its success upon nutsells and asbestos fibers. The patentee states that there is no fibrous alternative to asbestos fibers. Further, U.S. Pat. No. 3,629,102 describes a three component mixture of nutshells (course and finer) and sugar cain fibers. Many other patent disclosures were discussed of the above-mentioned disclosure.

The problem with the materials used and described in the prior art thus far is that once the permeability of a formation has been sealed by whatever materials used, the formation cannot be reopened to achieve satisfactory permeability for oil production. Many times when lost circulation occurs, it may be into the intended producing formation itself. When this occurs with a lost circulation material in the system, the potential producing formation is sealed off, permeability reduced and production of oil from the formation becomes more difficult. The formation can only be reopened and permeability restored with difficulty.

The lost circulation material of this invention not only provides a material that will seal both formation fractures and permeable formations, it, more importantly, accomplishes this using a material that can be degraded using an acid without damaging the potential producing formation. By providing a soluble or degradable lost circulation material, the seal that is formed on the face of the producing formation can be reopened to allow the formation to produce. No prior art has thus far disclosed such a composition of material to effectuate the desired degradation. In fact, some prior art, casts doubt that the components of the composition of this invention are even satisfactory for use to prevent or stop the loss of circulation during drilling operations.

This invention provides a material which degrades upon contact with an acid that will not interfere with the production process of the well itself. Ideally, the seal breaking process should be compatible with the well production process.

SUMMARY OF THE INVENTION

This invention relates to a lost circulation material comprising a mixture of flexible flakes, fibers and rigid, or granular, particles for injection into a well communicating with underground formations to seal formations of high permeability or fractured formations. The components used in the composition of this invention are water insoluble and hydrocarbon insoluble with at least one component, and preferably all three components, which degrades in the presence of an acid to break down the seal formed by the material in order to restore the permeability of a formation, usually the oil producing formation, in the well. The composition of this invention is mixed with a carrying liquid, either as a component of a drilling fluid or in a "shot" or "pill" specifically injected into a well penetrating various subterranean formations, in order to plug a formation and prevent the loss of circulation of a drilling fluid into the formations.

Upon reaching total depth of a well, during completion for production operations, the well may be acidized in a manner well known in the art and, when using the composition of this invention, the permeability of the formation can be restored.

DETAILED DESCRIPTION OF THE INVENTION

The objects of this invention are accomplished by using a specific type of flakes mixed in a definite ratio with fibers and rigid particles. Shredded or chopped paper serves as an excellent flexible flake material, and is preferred. Mineral, or rock, wool serves as the fibrous material and calcium carbonate ($CaCo_3$) functions well as the rigid particle component. These materials are the preferred species of the materials used in the composition of the invention. All three of these components degrade in the presence of acids and test data show that the seal the composition forms is degraded, and permeability restored, upon the introduction of hydrochloric acid (HCl) to the system as is often done in treating a formation to achieve oil production.

In addition to breaking the seal formed by the composition, the acidizing step is completely compatible with production techniques since the initial phase of many fracturing processes is acidation of the formation. Even when the formation does not need to be acidized, the introduction of acid to remove the seal formed before placing the well into production does not harm the potential producing formation.

The practice of this invention is successful in sealing both fractured formations and highly permeable formations from lost circulation situations during drilling operations. The two standard tests used to simulate conditions in the field are the marble test which simulates permeable formations and the slot test which simulates fractured formations. These tests are widely accepted in the industry to demonstrate the usefulness of lost circulation preventatives or additives. By observing some limitations on the amounts of the components as set forth herein, we can produce a composition that seals both permeable and fractured formations.

Because cellulose is the chief component of wood and plant fibers, the flexible flake material used may take on many forms and still perform the same essential functions. Normally the long chains of cellulose lie side by side to form bundles that twist together to form fibers that can be manipulated to form a wide variety of useful materials such as paper products and fabrics. The action of acid breaks the glycoside linkages of cellulose, yielding glucose which is ineffective as the supporting component of lost circulation material. The preferred embodiment of the flexible flake material is shredded paper which represents a relatively inexpensive source of flaked material. Such material maintains the desired property of being water and hydrocarbon insoluble and being degradable in the presence of an acid.

The fiber component of the composition may vary widely in size and must be sufficiently flexible to pass through the pumping equipment, must be water and hydrocarbon insoluble, and yet should, preferably, also degrade in the presence of an acid. Fibers such as mineral wool, or rock wool, are preferred.

The rigid granular particle component of the composition is preferably calcium carbonate because of its low cost and particle strength. Calcium carbonate is, for all practical purposes, insoluble in water and hydrocarbons yet quite reactive with HCl to form calcium chloride, carbon dioxide and water. The reaction goes to completion because the carbon dioxide escapes as a gas, leaving only calcium chloride ($CaCl_2$) which is quite soluble in water (about $4.25 \times 10^4$ times more soluble than calcium carbonate). Other alkaline earth metal salts, such as magnesium carbonate and barium carbonate can be used with substantially the same results.

It is evident from the tests that the seal may be broken only if at least one of the necessary components is soluble or degradable. For instance, if the rigid particles are dissolved with acid, what remains would be a web type configuration that allows fluid to invade the formation. Likewise, if either the fibers or flakes are dissolved or degraded, the rigid particles have no lattice structure upon which to pack and are washed into the formation resulting in an invasion of the formation by the drilling fluid. Of course, if two of the components are soluble or degradable, the seal breaking process will be even more complete and possibly even faster.

The preferred embodiment of this invention occurs where all three components of the composition degrade in contact with acid and are insoluble in water and hydrocarbons. With all three components acid degradable, the composition is a universal sealant that can be suited to seal and be dissolved from all formations. Each component must be insoluble in water and hydrocarbons to allow the composition to circulate in a drilling fluid which is usually a mixture of water or oil and other well known additives. The composition can be used continuously in a drilling operation without regard to the type of formation encountered and without changing the drilling fluid in anticipation of encountering an oil producing formation.

The acid of choice in most oil field operations is hydrochloric acid (HCl). This acid is also preferred for use in degrading the seal formed access the face of a producing formation. Of course, other strong acids, such as, for example, hydrogen bromide (HBr) and nitric acid ($HNO_3$), can be used as substitutes without substantially changing the results. The only restriction is that the salt formed by reaction with components of the lost circulation compositions should be sufficiently soluble in water or hydrocarbons in order not to interfere with production operations. For instance, sulfuric acid may not be a good choice when calcium carbonate is the rigid granular particle because calcium sulfate may not be sufficiently soluble in the water. However, $H_2SO_4$ may perform adequately because it will also serve to degrade the other two components in the seal such that permeability of a producing formation is restored.

The only other restriction on the acid is that it be in a sufficient concentration to react with the various components of the composition. Though the methods of acidation are well known to the industry, the preferred strength of the hydrochloric acid is from about 15% to about 25% by volume.

The composition can be used in many ways and in varying concentrations in a drilling fluid to stop the loss of drilling fluids to drilled formations. Because the composition is water and hydrocarbon insoluble, it can be circulated continuously in the drilling fluid which usually is either water or oil based. When the composition is circulated continuously, the drilling fluid would normally include a thickener to prevent the composition from settling out in the mud pit. The thickeners and other additives used in drilling fluids, or muds, are well known and the compositions of this invention are compatible with such thickened drilling muds.

When used in a drilling fluid, or mud, an effective amount of the lost circulation preventative should be the effective amount which will serve to seal off fractured or permeable formations while drilling. This effective amount may be determined in the field by those skilled in the drilling art. Preferably, the concentration of composition during continuous circulation may be as little as about 2 pounds per barrel of drilling fluid which will effectively seal most formations before fluid loss starts. If loss of circulation continues to be a problem, higher concentrations of the composition, preferably from 5 to 20 pounds per barrel, may be added to effect a seal. The composition can be either incorporated into the entire mud system or in a concentrated mixture of the composition and drilling mud having up to about 50 pounds per barrel which can be introduced into the well as a "pill" and circulated to the point of lost circulation and backed up by the regular mud system to push the composition into the formation at the point where the fracture or area of high permeability exists. The upper limitation of the amount of the lost circulation material of this invention is determined, as a practical matter, by the ability to pump the composition and the carrier fluid down the well. The preferred concentration for continuous drilling operations is from 2 to about 20 pounds per barrel and as a "pill" is from about 10 to about 30 pounds per barrel of drilling fluid.

Even though well known, the method of drilling a well through underground formations in the search for oil involves penetrating the formations with a drill string and a bit while circulating through the drill string and bit a drilling mud which comes up the well in contact with the drilled formations into which circulation may be lost. The muds would contain many well known additives including lost circulation additives. This invention is an improvement upon the prior art methods by using the lost circulation composition described herein.

Once a potential oil producing formation is reached and a seal is effected at that formation, the drilling operation can be carried forward to completion through the producing formation. When the well is ready to be completed for production, hydrochloric acid may be introduced into the producing zone and allowed to degrade the composition and restore permeability. The producing formation is then clean and open to production of hydrocarbon by appropriate means.

Test data provides information concerning the many variations of the composition useful in the practice of this invention. The test data relating to the preferred embodiments of the invention are shown on Table I. The marble test is performed using a standard filter cell and 200 grams of marbles measuring 3/16 inch in diameter. The material used in running the test was an unweighted drilling mud. It was prepared by placing 350 cc of unweighted mud in a Hamilton Beach stirring cup and adding amounts of the composition to give the desired loading (1 gram/350 cc is equivalent to 1 lb/bbl) and stirred for five minutes. The material is poured into the filter cell and the cell is pressured to 40 psi and the time measured for the spurt of fluid through the filter to become a drip. The pressure is increased to 100 psi and the same time measurement is taken.

TABLE I

| Test No. | Total LBS/BBL | COMPONENTS (%) | | | SEAL FORMATION | | ACID TREAT | COMMENTS |
|---|---|---|---|---|---|---|---|---|
| | | Paper | CaCO$_3$ | Rock Wool | Marble Test | Slot Test | 19% HCl | |
| Single Component Tests | | | | | | | | |
| 1 | 10 | 100 | | | No | No(.20)[2] | | |
| 2 | 20 | 100 | | | No | No(.20) | | |
| 3 | 30 | 100 | | | Yes | No(.20) | Yes | (1) |
| 4 | 10 | | 100 | | No | No(.06) | | |
| 5 | 20 | | 100 | | No | No(.06) | | |
| 6 | 30 | | 100 | | No | No(.06) | | |
| 7 | 10 | | | 100 | No | No(.20) | | |
| 8 | 20 | | | 100 | No | No(.20) | | |
| 9 | 30 | | | 100 | No | Yes(.20) | Yes | (1) |
| Two Component Tests | | | | | | | | |
| 10 | 30 | 50 | 0 | 50 | No | | | |
| 11 | 30 | 0 | 50 | 50 | No | | | |
| 12 | 30 | 50 | 50 | 0 | Yes | | [ ] | (1) |
| Three Component Tests | | | | | | | | |
| 13 | 30 | 33.3 | 33.3 | 33.3 | Yes | Yes(.20) | | Yes |
| 14 | 10 | 33.3 | 33.3 | 33.3 | Yes | Yes(.20) | | Yes |
| 15 | 30 | 16.6 | 66.6 | 16.6 | Yes | Yes(.20) | | Yes |
| 16 | 20 | 10 | 88 | 2 | Yes | | | Yes |
| 18 | 30 | 10 | 85 | 5 | Yes | | | Yes |
| 19 | 30 | 5 | 92.5 | 2.5 | Yes | | | Yes |

[1]too thick to pump
[2]Slot width, inches

In each of these tests the cell was loaded with lost circulation material and pressurized to 40 psi. Once a seal was formed the pressure was increased to 100 psi. In order to demonstrate the effectiveness of the material as a means for stopping the dissipation of lost circulation material, it must hold under a pressure of at least 100 psi. The concentration of the components of the composition is in pounds per barrel with the barrel containing 42 U.S. gallons and the component ratio is in terms of dry weight.

The only component used in test 1, 2 and 3 was shredded paper and the concentration varied from 10 pounds per barrel to 30 pounds per barrel. Tests 1, 2 and 3 result in seal formation only in the 30 pounds per barrel marble test; however, this concentration is too thick to pass through well pumping equipment. In tests 4, 5 and 6 the only component used was CaCo$_3$ at concentrations of 10-30 pounds per barrel. The tests show the CaCO$_3$ material ineffective in sealing both the marble bed and a 0.06 inch slot. In tests 7, 8 and 9 the only component used was mineral wool at concentrations of 10-30 pounds per barrel. At the higher concentration, a seal was formed in the slot test but not in the marble test. The conclusion that can be reached from tests 1-9 was that any one of the components used alone will not function effectively as a loss circulation material.

It is important to note that even when a seal is formed in marble test 2 and slot test 6, the seal was broken when 19% HCl was added to the system thus demonstrating that the permeability of a producing formation can be restored by an acidation step with hydrochloric acid, a step that is normally followed in normal completion and production operations.

When any two of the materials are used, the results are also unsatisfactory either because no seal was formed or because the concentration of material needed to affect the seal was too thick to allow pumping. Test 10 using 15 pounds of shredded paper and 15 pounds of mineral wool per barrel results in no seal formation and a composition too thick to pump. Test 11 using 15 pounds of CaCO$_3$ and 15 pounds of rock wool per barrel shows no seal formation, and the composition used in test 12 with 15 pounds of paper and 15 pounds of CaCo$_3$ formed a seal in the marble test but was too thick to pump. The conclusion that can be reached from this series of tests is that any combination of two of the components of the composition is ineffective as a loss circulation material.

Tests 13, 14 and 15 show the desired results when all three components are mixed. Test 13 results in seal formation when each component's concentration is 10 pounds per barrel. The composition seals a 0.20 inch slot and the marble bed. The seals are then treated with 19% HCl solution by the addition of such acid to the test cell which dissolves or degrades the composition to such an extent that all the remaining volume in the test cell runs out. The result shows that the seal was broken and that the sealing process has been effectively reversed. Had this been a potential oil producing formation, it would then have been open to further stimulation by whatever methods appropriate and productive.

The results of test 14 shows that equal concentrations of the three components function well in sealing both the marble bed and the slot bed even when the total concentration of the components was as low as 10 pounds per barrel of drilling fluid. The seal was likewise dissolved upon addition of 19% HCl. The results of test 15 shows that the concentration of the components can be widely varied by doubling the CaCO$_3$ concentration and halving the shredded paper and mineral wool concentrations without changing the effectiveness of the composition. Both the marble and slot seals were formed, and likewise dissoved upon addition of 19% HCl. This flexibility with the relative concentrations of the components allows the user to mix the most economical composition while retaining a wide margin of error in successful field operations.

Further experiments performed on the marble test showed that even greater variations in the percentages of components are possible when dealing with a specific type of formation. Although the composition is designed for continuous circulation with the drilling fluid, and the relative concentrations of components used in both tests 13 and 15 would have worked well in sealing both types of formations previously discussed, if the user encounters a known type of formation he can change the relative percentages to achieve a faster or stronger seal. The results of test 16 shows that the marble bed was sealed using 20 pounds per barrel of the lost circulation material; the relative percentages, by weight, being 10% shredded paper, 88% CaCO$_3$, and 2% mineral wool. The seal was effectively broken when treated with 19% HCl.

In test 18, 30 pounds of composition per barrel of fluid was used with 10% being shredded paper, 85% CaCO$_3$ and 5% mineral wool. This higher concentration of material formed a seal in the marble bed that was dissolved or degraded by 19% HCl.

The results of test 19 shows a decreased concentration of shredded paper at 5% and mineral wool at 2.5% and a CaCO$_3$ concentration of 92.5%. A seal was likewise formed and then dissolved by 19% HCl. These extreme variations of component percentages in the composition do not affect the ability of the composition to form a seal over the marble bed nor hinder its dissolution by 19% HCl.

Usable concentration ranges of the total components of the composition vary from about 2 to 5 pounds per barrel of carrying liquid as shown by the results of test 14 to about 40 or 50 pounds per barrel depending upon the concentration ratio used. Tests 13 through 16 illustrate the preferred range of from about 10 pounds to about 40 pounds per barrel, but higher concentrations would be acceptable provided the pumping equipment can circulate the composition.

Tests 13 and 19 illustrate the general range of the component ratios. The flake component is present in an amount from about 3% to about 40% by weight of the composition, the fiber component is present in an amount from about 2% to about 40% by weight of the composition, and the rigid granular particle component is present in an amount from about 20% to about 95% by weight of the composition. The preferred range of the component ratios with composition are from about 5% to about 20% by weight of shredded paper, from about 5% to 20% about 40% by weight of mineral wool, and from about 60% to 90% by weight of CaCO$_3$.

The methods and materials described above are given principally for example only and other components will be apparent to those skilled in the art having read the foregoing description of the invention which is offered for purposes of illustration and not limitation of the invention as set forth in the appended claims.

We claim:

1. A composition for preventing loss of drilling fluids to drilled formations to be introduced into a well penetrating the formation by a carrying liquid, said composition comprising water- and hydrocarbon-insoluble shredded paper, mineral wool and rigid granular alkaline earth metal carbonate particles as components wherein the components degrade in the presence of an acid to the extent that a permeability is restored after acidation to allow hydrocarbons to be produced from the formation; wherein said shredded paper is present in an amount from about 3% to about 40% by weight of the composition, said mineral wool is present in an amount from about 2% to about 40% by weight of the composition, and said granular particles are present in an amount from about 20% to about 95% by weight of the composition.

2. The composition of claim 1, wherein the rigid particle is calcium carbonate.

3. A composition for stopping loss of drilling fluids to drilled formations to be introduced into a well, penetrating the formation, by a carrying liquid wherein from about 5% to about 20% by weight of the composition is shredded paper, from about 5% to about 20% by weight of the composition is mineral wool, and from about 60% to about 90% by weight of the composition is calcium carbonate.

4. A method for preventing loss of drilling fluid to drilled formations during operations for drilling a well to produce hydrocarbons which comprise mixing into the drilling fluid being circulated in the well an effective amount of a composition comprising shredded paper, mineral wool, and rigid granular alkaline earth metal carbonate particles wherein all three components of the composition are water and hydrocarbon insoluble and will be degraded in the presence of an acid to restore permeability to allow hydrocarbons to be produced from the formation; wherein composition comprises from about 3% to about 40% by weight of the composition shredded paper, from about 2% to about 40% by weight mineral wool, and from about 20% to about 95% by weight rigid particles.

5. The method of claim 4, wherein the rigid particle is calcium carbonate.

6. A method for preventing drilling fluid loss to drilled formations during well drilling operations which comprises mixing into the drilling fluid being circulated in the well, an amount effective for preventing lost circulation a composition comprising from about 5% to about 20% by weight shredded paper, from about 5% to about 20% by weight rock wool, and from about 60% to about 90% by weight calcium carbonate.

7. The method of claim 6, wherein an effective amount for preventing lost circulation is at least about 2 pounds per barrel of carrying liquid.

8. A method for preventing loss of drilling fluid to drilled formations during operations for drilling a well to produce hydrocarbons comprising mixing into the drilling fluid from about 5 pounds per barrel to about 30 pounds per barrel of a composition comprising from about 5% to about 20% by weight shredded paper, from about 5% to about 20% by weight mineral wool, and from about 60% to about 90% by weight calcium carbonate, and circulating such drilling fluid containing such compositions to the drilled formation.

9. In a method for drilling a well through underground formations for the prupose of finding and producing hydrocarbons from drilled formations which comprises penetrating the formations with a drill string and bit while circulating a drilling fluid through the drill string and bit and up the well in contact with the drilled formations, the improvement which comprises mixing and circulating with the drilling fluid from about 2 to about 20 pounds per barrel of drilling fluid of a lost circulation composition comprising from about 3% to about 40%, by weight, shredded paper, from about 2% to about 40%, by weight, rock wool and from about 20% to about 95%, by weight, calcium carbonate.

* * * * *